United States Patent [19]

Tanaka et al.

[11] Patent Number: 5,767,992
[45] Date of Patent: Jun. 16, 1998

[54] COLOR REPRODUCING METHOD AND APPARATUS FOR CONVERTING A COLOR SPACE DATA INTO ANOTHER COLOR SPACE DATA

[75] Inventors: Kenji Tanaka, Moriya-machi; Asako Kato, Sagamihara, both of Japan

[73] Assignee: Victor Company of Japan, Ltd., Japan

[21] Appl. No.: 666,973

[22] Filed: Jun. 20, 1996

[30] Foreign Application Priority Data

Jun. 22, 1995 [JP] Japan .................. 7-179405

[51] Int. Cl.⁶ .................................................. H04N 1/46
[52] U.S. Cl. .......................... 358/520; 382/162; 382/167
[58] Field of Search ............................ 358/518–522, 358/530; 382/166, 167

[56] References Cited

U.S. PATENT DOCUMENTS 5,243,414  9/1993  Darymple .................. 358/500
5,539,510  7/1996  Spaulding et al. .......... 358/518

FOREIGN PATENT DOCUMENTS 6-315084  11/1994  Japan ................ H04N 1/46

*Primary Examiner*—Thomas D. Lee
*Assistant Examiner*—Jerome Grant, II
*Attorney, Agent, or Firm*—Michael N. Meller

[57] ABSTRACT

Color reproducing ranges of a CRT and a printer are divided to a plurality of sector areas which extend radially from a predetermined center point on an achromatic color axis (L* axis). For each sector area, a number of maximum distances of the color reproducing ranges of the CRT and the printer are measured from the predetermined center point. This maximum distance data are used to calculate a compression or expansion ratio for compressing the color reproducing range of the CRT into the color reproducing range of the printer, or vice-versa, the color reproducing range of the printer can be expanded into the color reproducing range of the CRT. With this compression or expansion ratio, the color space data of the CRT is compressed or expanded into the color reproducing range of the printer toward or away from the predetermined center point. Thus, it is possible to convert the color reproducing ranges of the CRT to that of the printer without losing a balance of luminosity and chroma.

12 Claims, 6 Drawing Sheets

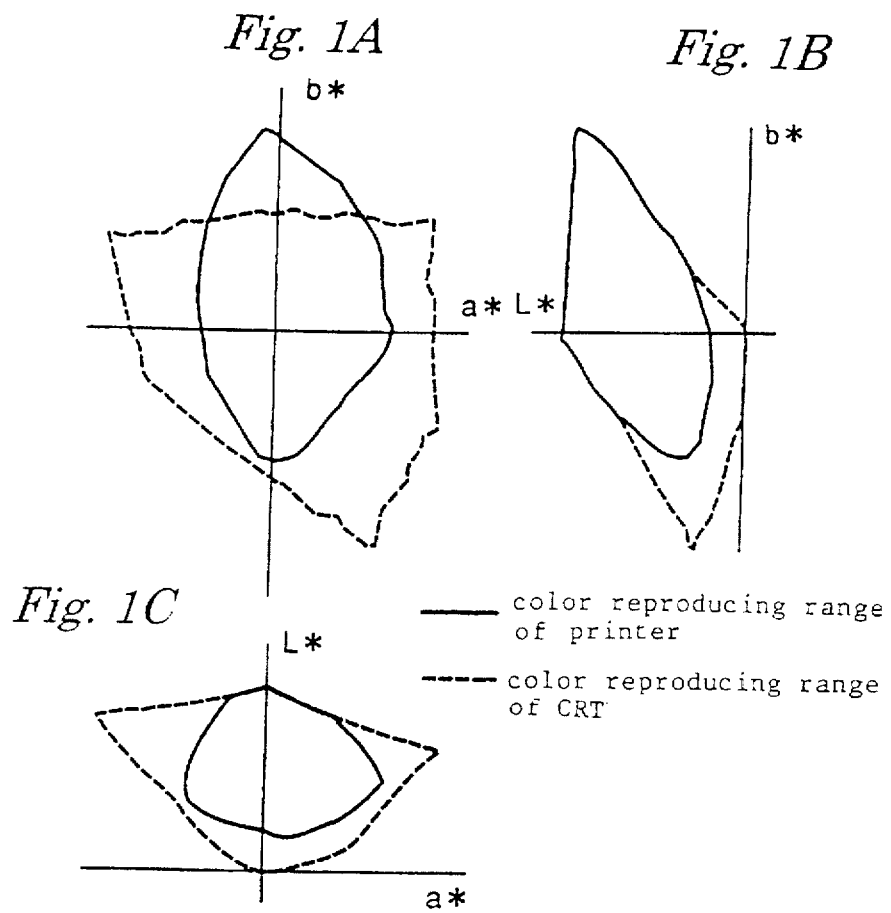
Fig. 1A
Fig. 1B
Fig. 1C
—— color reproducing range of printer
---- color reproducing range of CRT
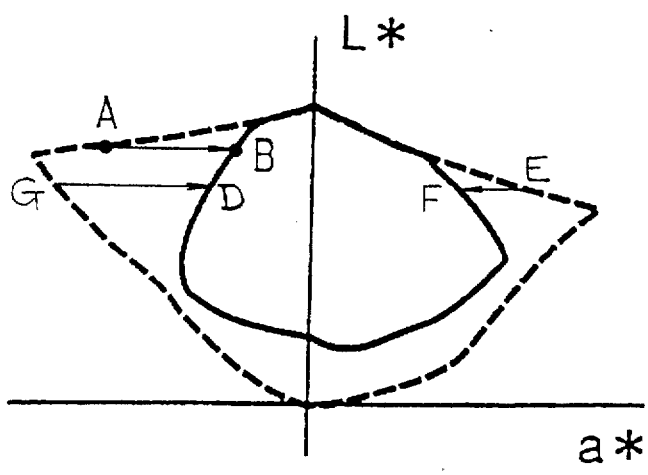
Fig. 2
Prior Art

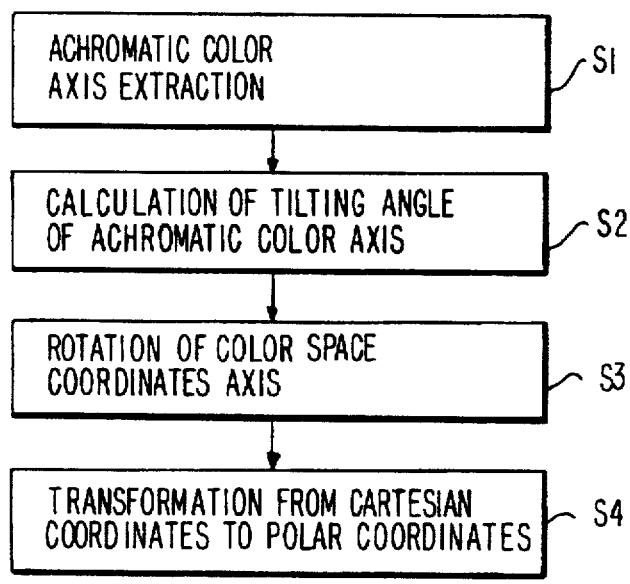
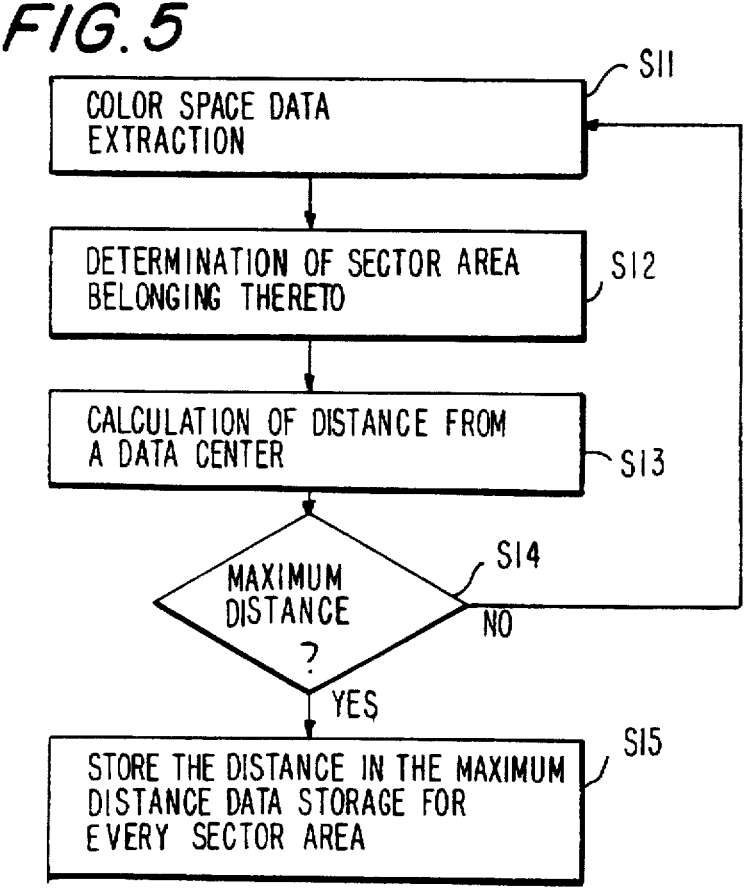

Fig. 8A
Fig. 8B
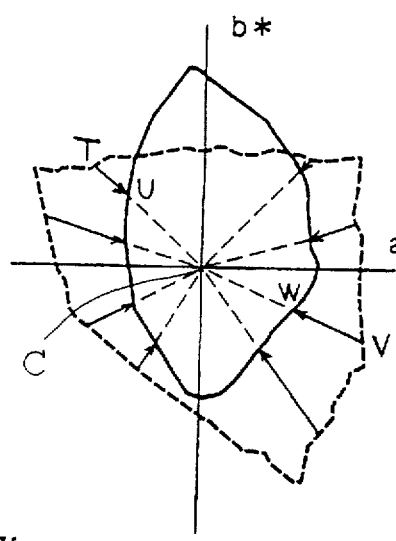
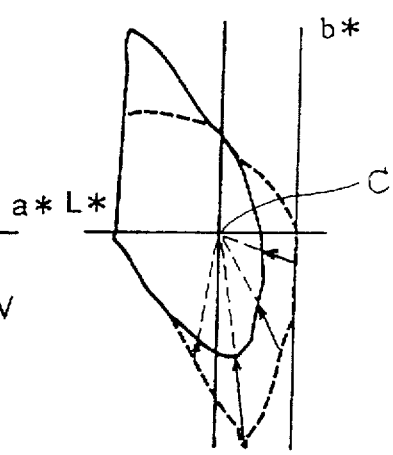
Fig. 8C
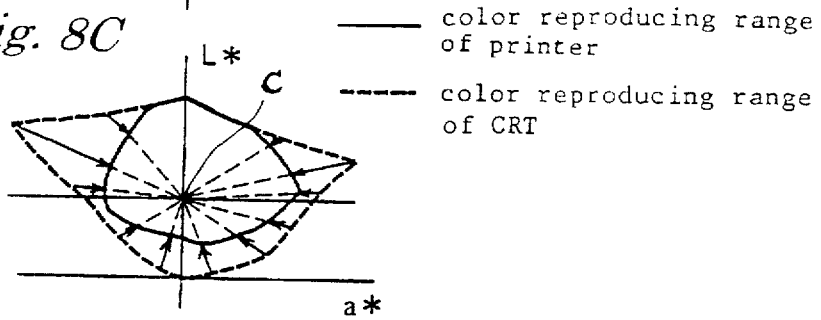
——— color reproducing range of printer
- - - - color reproducing range of CRT

COLOR REPRODUCING METHOD AND APPARATUS FOR CONVERTING A COLOR SPACE DATA INTO ANOTHER COLOR SPACE DATA

BACKGROUND OF THE INVENTION

1. Field of the Invention

The present invention relates to a color reproducing method and apparatus for use in a digital color picture output apparatus for outputting a picture, such as displayed on a cathode ray tube (CRT) or input from a color scanner, by a printer which has a color reproducing range different from that of the CRT or the scanner.

2. Description of the Prior Art

It has been known that, when a color picture read out by, for example, a color scanner is to be output from a color printer, a color reproducing processing is performed in order to compensate for the color deviations due to the differences in color reproducing ranges between the color scanner and the color printer.

FIGS. 1A, 1B and 1C are useful in understanding a difference in color reproducing ranges between the printer and a cathode ray tube (CRT). In the well known L*a*b* space construction where a* and b* define a two dimensions plane and L* is an achromatic color axis that is perpendicular to plane a* b* in a color reproducing range, a color reproducing range of the printer is shown by a solid line and a color reproducing range of the CRT is shown by a dotted line. The solid and dotted line are substantially different from each other as shown in FIGS. 1A, 1B and 1C.

Japanese Patent Application Laid-open No. H6-315084 discloses an example of a conventional processing technique for reproducing color. In the conventional color reproducing technique, it is usual to compress luminosity and chroma of a color separately. In FIG. 2 (Prior Art), a solid line shows a color reproduction range of a printer and a dotted line shows a color reproduction range of a CRT. For example, in a case of compression of chroma, it is compressed to be parallel to an a* (horizontal) axis such that a point A in the color reproduction range of the CRT is compressed to a point B of the color reproduction range of the printer, as shown in FIG. 2. Similarly, points G and E are compressed respectively to points D and F of the color reproducing range of the printer.

However, in the conventional color reproduction processing shown in FIG. 2, there is a problem that only chroma of a color portion which is originally high in both chroma and luminosity becomes low and a balance of luminosity and chroma tends to be lost. That is, chroma of the point A in FIG. 2 which is high in both luminosity and chroma is lowered by compression to the point B in a direction perpendicular to the L* axis.

SUMMARY OF THE INVENTION

An object of the present invention is to provide a color reproducing method and apparatus capable of converting a color reproducing range into another color reproducing range without losing a balance between luminosity and chroma.

Another object of the present invention is to facilitate a calculation necessary for color data compression in converting a first color reproducing range to a second different color reproducing range.

A feature of the present invention is to divide each of two color space data having different color reproducing ranges into a plurality of sector areas radially extending from a center set as a predetermined point on an achromatic color axis and the space data are then compressed or expanded in every sector area toward or away from the center point.

A further object of the present invention is to provide a color reproducing method for converting a first color space data having a first color reproducing range into a second color space data having a second color reproducing range. This method comprises a step of dividing the first and second color reproducing ranges into a plurality of sector areas radially extending from a predetermined center point on an achromatic color axis, a first calculating step of calculating the maximum distances between said first and second color reproducing ranges as measured from said predetermined center point for every sector area, another calculating step of calculating a color data compression or expansion ratio for compressing or expanding one of said first and second color space data into the other one of the color space data on the basis of the differences in the measured maximum distance between said first and second color reproducing ranges, and a step of compressing or expanding one of said first and second color space data into the other one of the color reproducing range toward or away from said predetermined center point by use of the calculated compression or expansion ratio.

It is still a further object of the present invention to provide a color reproducing apparatus for converting a first color space data having a first color reproducing range into a second color space data having a second color reproducing range. Said apparatus comprises dividing means for dividing said first and second color reproducing ranges into a plurality of sector areas radially extending from a predetermined center point on an achromatic color axis, first calculating means for calculating the maximum distances between said first and second color reproducing ranges as measured from said predetermined center point for every sector area, second calculating means for calculating a color data compression or expansion ratio for compressing or expanding one of said first and second color space data into the other one of the color space data on the basis of the difference in the measured maximum distance between said first and second color reproducing ranges, and compressing/expanding means for compressing/expanding one of said first and second color space data into the other one of the color reproducing range toward or away from said predetermined center point by use of the calculated color data compression expansion ratio calculated by the second calculating means.

BRIEF DESCRIPTION OF THE DRAWINGS

FIGS. 1, 1B and 1C show the differences in color reproducing ranges between a cathode ray tube (CRT) and a color printer;

FIG. 2 shows a conventional color reproducing range conversion;

FIG. 4 is a flowchart of a normalization processing of an achromatic color axis in the present invention;

FIG. 5 is a flowchart of a maximum distance calculation processing for every sector area in the present invention;

FIGS. 8A, 8B and 8C are diagrams for explaining a color space compression or expansion according to the present invention.

FIGS. 8A and 7A are identical to each other, FIGS. 8C and 7B are also identical to each other. FIG. 8B shows the CRT range and printer range in the L*b* plane. Point C is a compression or expansion center of the L* a*b* space.

DETAILED DESCRIPTION

An embodiment of the present invention will be described with reference to FIGS. 3 to 8.

Figure 3:
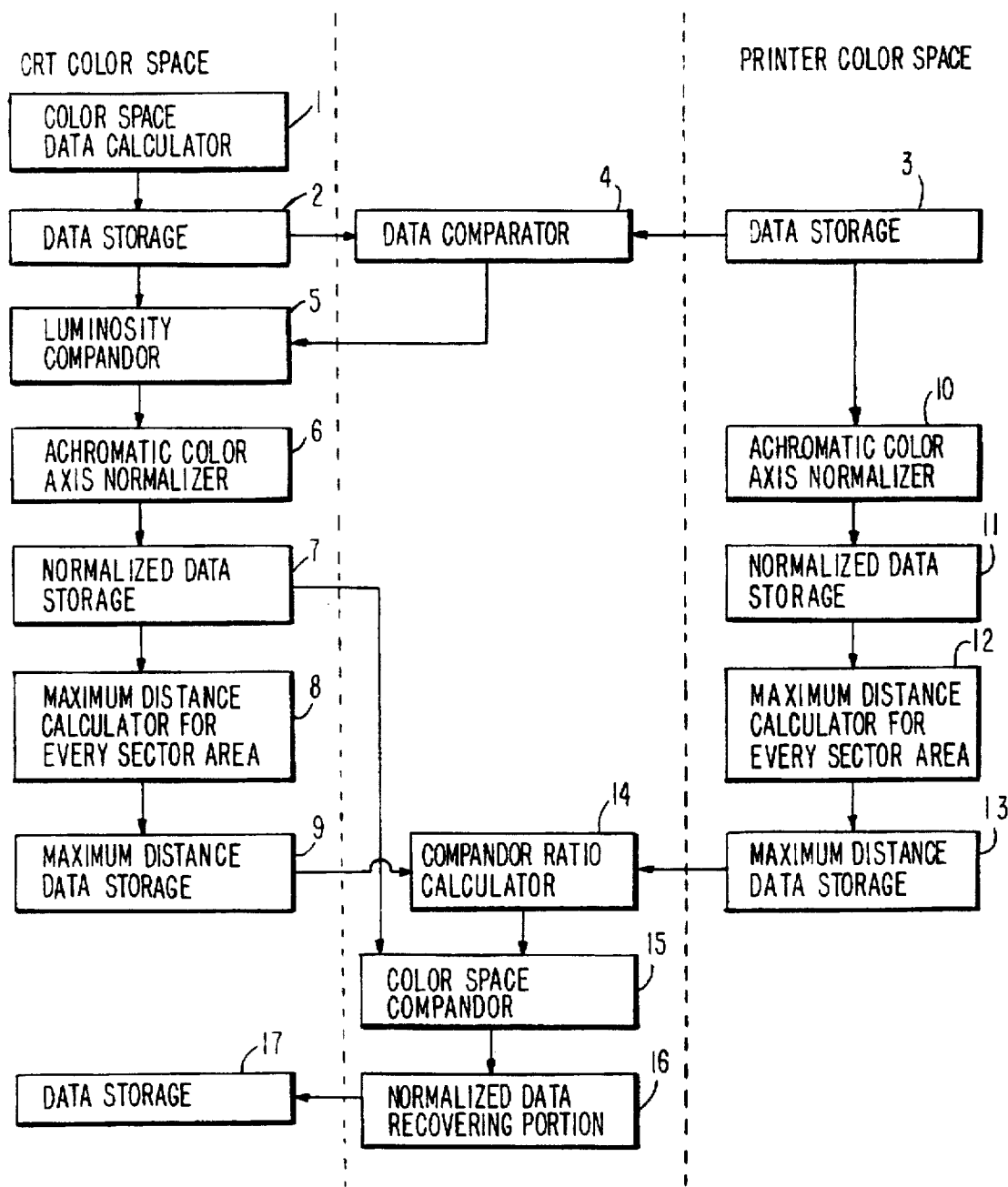
FIG. 3 is a block diagram of an embodiment of a color reproducing apparatus according to the present invention.

In FIG. 3 which is a block diagram of an embodiment of the present invention, a color space data calculator 1 on the side of a cathode ray tube (CRT) color space calculates a CRT color space data and a data storage 2 stores a resultant color space data. A data storage 3 on the side of a printer color space has stored a printer color space data. A data comparator 4 compares the CRT color space data from the data storage 2 with the printer color space data from the data storage 3 and outputs a result of this comparison which is input to a luminosity compressor/expandor (i.e. a compandor) 5 on the CRT color space side. The luminosity compandor 5 compresses or expands a luminosity of the CRT color space data output from the data storage 2 such that it falls into a luminosity of the color reproducing range of the printer, as shown in FIG. 6.

Figure 6:
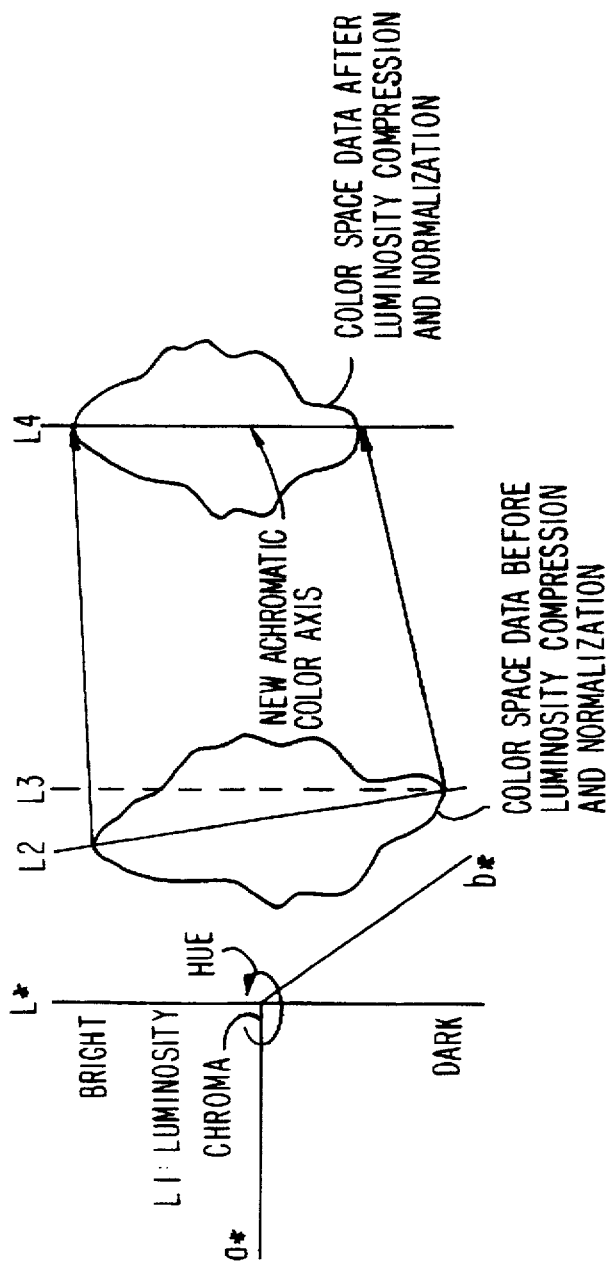
FIG. 6 shows a luminosity compression according to an embodiment of the present invention.

In FIG. 6, L* is the vertical luminosity axis "L1", and a* and b* defines a horizontal plane perpendicular to the L* axis which represents "hue".

In FIG. 6, "L1" is the luminosity axis, "L2" is achromatic axis before normalization, "L3" is the normalized (new) achromatic axis, and "L4" is an axis parallel to the new achromatic axis L3.

It is preferable, in compressing/expanding the luminosity of the CRT color space data to the luminosity of the color reproducing range of the printer to do so with minimum unnatural deformation of a picture. This brings an achromatic color axis of the CRT color space data (straight line connecting a white point (not shown) of the CRT and a darkest color (not shown) which can be displayed by the CRT) to an achromatic color axis of the color space data of the printer (a straight line connecting a color of a printing sheet and the darkest point a*=b*=0 which can be printed by the printer).

Referring to FIG. 3, the output of the luminosity compandor 5 is input to a normalizer 6 of the achromatic color axis. The achromatic color axis normalizer 6 normalizes the achromatic color axis according to the flowchart shown in FIG. 4. That is, normalizer 6 normalizes the achromatic color axis to 0 a*=b*=0 in the L*a*b* space shown in FIG. 6. As shown in FIG. 4, the achromatic color axis is extracted (in step S1) and a tilting angle between L2 and L3 of FIG. 6 of the achromatic color axis is calculated (in step S2 of FIG. 4). Further, a color space coordinate axis is rotated (in step S3) and transformed from Cartesian coordinates to polar coordinates (in step S4). With this normalization of the achromatic color axis, the new achromatic color axis is straight, that is, a*=b*=0, as shown in FIG. 6. This normalization of the achromatic color axis is performed to facilitate a calculation for data compression.

In this embodiment of FIG. 3, the CRT color space data is compressed by luminosity compandor 5, then, the achromatic color axis of the CRT color space data is normalized by the normalizer 6. It is possible to perform this operation such that the CRT color space data is normalized first by the normalizer 6, then the CRT color space data is compressed by luminosity compandor 5.

Referring to FIG. 3, an output of the achromatic color axis normalizer 6 is input to a normalized data storage 7. A maximum distance calculator 8 calculates a maximum distance of each sector area on the basis of the data stored in the normalized data storage 7 as will be described in detail later. The maximum distance calculated for each sector area is stored in a maximum distance data storage 9.

On the other hand, the output of the data storage 3 on the side of the printer color space is input to a normalizer 10 which normalizes the achromatic color axis of the printer in a similar manner to the normalizer 6 on the side of the CRT color space. That is, the achromatic color axis is made a*=b*=0. With this normalization, the achromatic color axis of the CRT color space coincides with the achromatic color axis of the printer color space, so that colors on the achromatic color axis do not deviate from each other.

An output of the achromatic color axis normalizer 10 is input to a normalized data storage 11. A maximum distance calculator 12 calculates the maximum distance of every sector area on the basis of the data stored in the normalized data storage 11 as will be described in detail later. The calculated maximum distance of every sector area is stored in a maximum distance data storage 13.

Figure 7A:
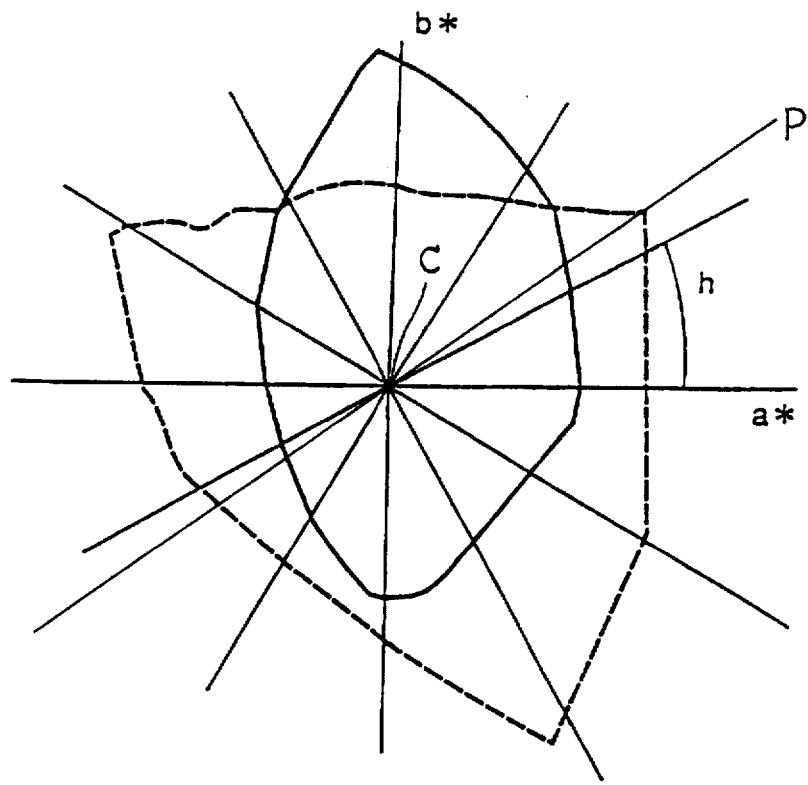
FIG. 7A is an a*b* plan view for explaining an area division according to an embodiment of the present invention.
Figure 7B:
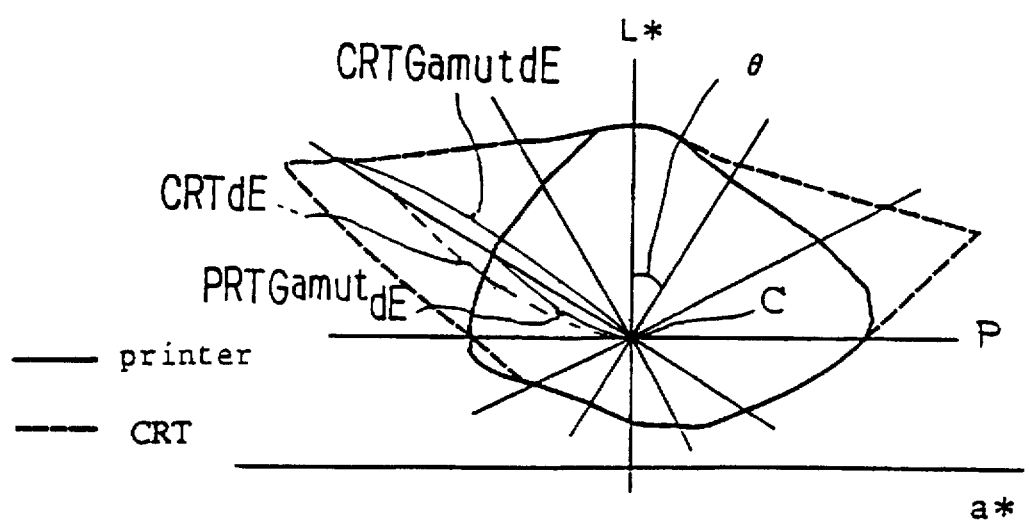
FIG. 7B is an L*a* plan view for explaining an area division according to an embodiment of the present invention.

An operation of the maximum distance calculator 8 as well as the maximum distance calculator 12 will now be described. FIGS. 7A and 7B show the color reproducing ranges of the CRT and the printer. In these figures, the solid lines show the color reproducing range of the printer and the dotted lines show the color reproducing range of the CRT. Hue of the color reproducing range of the CRT as well as the printer is divided in the a*b* plane having the L* axis (achromatic color axis) as a center by dividing the center angle about center C by a predetermined angle of h degrees to form a plurality of sector areas as shown in FIG. 7A. In the L*a* plane, the color reproducing range of the CRT as well as the printer is divided about the predetermined center point C on the L* axis by a predetermined angles of θ degrees to form a plurality of sector areas as shown in FIG. 7B. In this case, it is preferable that the predetermined center point C is on the L* axis at a cross point of a straight line P containing the center of the color reproducing range of the printer and the achromatic color axis orthogonal thereto.

In this manner, each of the color reproducing ranges of the CRT and the printer is divided into a plurality of portions each having a substantially pyramid shape with the apex of the pyramid on the achromatic color axis as shown in FIG. 7B.

The maximum distance calculators 8 and 12 of FIG. 3 calculate the maximum distance of every sector area according to the flowchart shown in FIG. 5. As shown in FIG. 5, the color space data is extracted (in step S11), a sector area belonging thereto is determined (in step S12) and a distance from a center of the data is calculated (in step S13). Then, it is determined whether or not the distance is the maximum distance (in step S14). If it is the maximum distance (Yes), the maximum distance data is stored in the maximum distance data storage's 9 and 13 (in step S15). If it is not the maximum distance (No), the process returns to the step S11.

The maximum distance data of the CRT color space and the printer color space which are output from the maximum distance data storage's 9 and 13 are input to a compression/ expansion (i.e. compandor) ratio calculator 14. As an example, the compandor ratio calculator 14, which calculates a compression/expansion ratio as described below.

That is, referring to FIG. 7B depicting the maximum distance data of the CRT color space from the center of the sector area is designated CRTGamut dE, and the maximum distance data of the printer color space is designated PRTGamut dE and a distance from a center of the CRT color space to be compressed is designated CRTDE as shown in FIG. 7B. A difference Δ Gamut (not shown) between the maximum distance data of the CRT color space CRTGamut dE and the maximum distance data of the printer color space PRTGamut dE is represented by the following equation (1):

$$\Delta Gamut = CRTGamut\ dE - PRTGamut\ dE \quad (1)$$

A compression/expansion coefficient a is used in compressing or expanding the CRT color space to the printer color space. The compandor coefficient α of compression or expansion is a function of CRTDE and can be obtained by the following equation (2):

$$\alpha(x) = (e^x - 1)/(e - 1) \quad (2)$$

where x is obtained by the following equation (3):

$$x(dE) = CRTdE/CRTGamut\ dE \quad (3)$$

The compandor ratio calculated by the compandor calculator 14 of FIG. 3 is input to a color space compandor 15 of FIG. 3. The color space is compressed or expanded accordingly. The new color space that is compressed or expanded is designated NEWdE (not shown). The color space compandor 15 compresses or expands the color space according to the following equation (4):

$$NEWdE = CRTdE - \alpha(x) \times \Delta Gamut \quad (4)$$

The CRT color space data after being compressed or expanded by the color space compandor 15 of FIG. 3 is input to a normalized data recovering portion 16 of FIG. 3. The normalized data recovering portion 16 recovers the achromatic color axis where a*=b*=0 to an actual achromatic color axis of the printer color space (a straight line connecting a color of a printing sheet and the darkest point a*=b*=0 which can be represented by the printer). An output of the normalized data recovering portion 16 of FIG. 3 is input to a data storage 17 and stored therein.

As shown in FIGS. 8A, 8B and 8C, a center C is a center of the sector areas shown therein. For example, in FIG. 8A, the points T and V of the CRT range are compressed respectively to points U and W of the printer range. FIGS. 8A, 8B and 8C show how the CRT color reproducing range is compressed to fall within the color reproducing range of the printer by compressing toward the center C.

Through the continuous processing mentioned above, the color reproducing range of the CRT is compressed to the color reproducing range of the printer. Although, in the described embodiment, luminosity of the CRT color space data is compressed by the luminosity compressor 5 such that the luminosity of the color reproducing range of the CRT coincides with that of the color reproducing range of the printer, this step is not always necessary and it is possible to perform the compression such that both the luminosity and chroma of the color reproducing range of the CRT coincide simultaneously with those of the color reproducing range of the printer, as shown in FIGS. 8A, 8B and 8C.

Since, in the color reproducing method and apparatus of the present invention, a portion of the color reproducing range of the CRT in which both the luminosity and chroma are high is transformed into at least a portion of the color reproducing portion of the printer in which both luminosity and chroma are high, it is possible to transform the color reproducing range without losing a balance of the luminosity and chroma.

Further, since, in this embodiment, the achromatic color axis is normalized, color on the achromatic color axis is always on that axis. Further, it is possible to perform a color reproducing range conversion with minimum feeling of physical disorder by use of a cross point of a straight line containing a center of the color reproducing range of the printer and the achromatic color axis orthogonal thereto as a point on the achromatic color axis (L* axis) which becomes a center of compression.

As described in detail, in the color reproducing method and apparatus according to the present invention, first and second color reproducing ranges are divided into a plurality of sector areas extending radially from a predetermined center point on an achromatic color axis, the maximum distances between the first and second color reproducing ranges as measured from the predetermined center point can be calculated for every sector area. Then a compression or expansion ratio for compressing or expanding one of a first and second color space data into the other one of the color space data on the basis of the differences in the measured maximum distance between the first and second color reproducing ranges is calculated and one of the first and second color space data is compressed or expanded into the other one of the color reproducing range toward or away from the predetermined point by use of this calculated compression or expansion ratio. It is thus possible to transform the color reproducing range without losing a balance of luminosity and chroma.

What is claimed is:

1. A color reproducing method for converting a first color space data having a first color reproducing range into a second color space data having a second color reproducing range substantially without losing a balance between luminosity and chroma and substantially without shifting hue, comprising the steps of:

dividing the first and second color reproducing ranges into a plurality of sector areas by dividing the hue of said first and second color reproducing ranges equally by a first predetermined angle and dividing said first and second color reproducing ranges in the L* and a* plane equally by a second predetermined angle, said plurality of sector areas extending radially from a predetermined center point on an achromatic color axis;

calculating for every sector area a plurality of maximum distances between said first and second color reproducing ranges as measured from said predetermined center point; another calculating step for calculating a compression ratio for compressing said first color space data into said second color space data on the basis of the differences in the plurality of maximum distances between the first and second color reproducing ranges; and compressing said first color space data into said second color reproducing range in a direction toward said predetermined center point by use of the calculated compression ratio.

2. A color reproducing method as claimed in claim 1, further comprising, before the dividing step, a step of normalizing achromatic color axes of said first and second color space data to a*=b*=0 in an L*a*b* space.

3. A color reproducing method as claimed in claim 1, wherein said predetermined center point is a point of intersection between a straight line containing a center of said second color reproducing range and a line that is orthogonal to said achromatic color axis.

4. A color reproducing apparatus for converting a first color space data having a first color reproduction range into a second color space data having a second color reproduction range substantially without losing a balance between luminosity and chroma and substantially without shifting hue, comprising:

dividing means for dividing said first and second color reproducing ranges into a plurality of sector areas by dividing the hue of said first and second color reproducing ranges equally by a first predetermined angle and dividing said first and second color reproducing ranges in the L* and a* plane equally by a second predetermined angle, said plurality of sector areas extending radially from a predetermined center point on an achromatic color axis;

first calculating means for calculating for every sector area a plurality of maximum distances between said first and second color reproducing ranges as measured from said predetermined center point;

second calculating means for calculating a compression ratio for compressing said first color space data into said second color space data on die basis of the differences in the plurality of maximum between the first and second color reproducing ranges; and compressing means for compressing said first color space data into said second color reproducing range in a direction toward said predetermined center point by use of the calculated compression ratio calculated by said second calculating means.

5. A color reproducing apparatus as claimed in claim 4, wherein normalizing means are provided before said dividing means divides said first and second reproducing ranges to sector areas said normalizing means normalizing achromatic color axes of the first and second color space data to a space where a*=b*=0 in an L*a*b* space.

6. A color reproducing apparatus as claimed in claim 4, wherein said predetermined center point is a point of intersection between a straight line containing a center of said second color reproducing range and a line that is orthogonal to said achromatic color axis.

7. A color reproducing method for converting a first color space data having a first color reproducing range into a second color space data having a second color reproducing range, comprising the steps of:

dividing the first and second color reproducing ranges into a plurality of sector areas, said plurality of sector areas extending radially from a predetermined center point on an achromatic color axis;

calculating for every sector area a plurality of maximum distances between said first and second color reproducing ranges as measured from said predetermined center point;

another calculating step for calculating a compression ratio for compressing said first color space data into said second color space data on the basis of the differences in the plurality of maximum distances between the first and second color reproducing ranges;

compressing said first color space data into said second color reproducing range in a direction toward said predetermined center point by use of the calculated compression ratio; and further comprising, before said dividing step, the step of preliminarily compressing only a luminosity of said first color space data such that the luminosity of the first color space data coincides with a luminosity of said second color space data.

8. A color reproducing method for converting a first color space data having a first color reproducing range into a second color space data having a second color reproducing range, comprising the steps of:

dividing the first and second color reproducing ranges into a plurality of sector areas, said plurality of sector areas extending radially from a predetermined center point on an achromatic color axis;

calculating for every sector area a plurality of maximum distances between said first and second color reproducing ranges as measured from said predetermined center another calculating step for calculating a compression ratio for compressing said first color space data into said second color space data on the basis of the differences in the plurality of maximum distances between the first and second color reproducing ranges;

compressing said first color space data into said second color reproducing range in a direction toward said predetermined center point by use of the calculated compression ratio;

further comprising, before the dividing step, a step of normalizing achromatic color axes of said first and second color space data to a*=b*=0 in an L*a*b* space; and further comprising before the normalizing step the step of preliminarily compressing only a luminosity of said first color space data such that the luminosity of the first color space data coincides with the luminosity of said second color space data.

9. A color reproducing apparatus for converting a first color space data having a first color reproduction range into a second color space data having a second color reproduction range, comprising:

dividing means for dividing said first and second color reproducing ranges into a plurality of sector areas, said plurality of sector areas extending radially from a predetermined center point on an achromatic color axis:

first calculating means for calculating for every sector area a plurality of maximum distances between said first and second color reproducing ranges as measured from said predetermined center point;

second calculating means for calculating a compression ratio for compressing said first color space data into said second color space data on the basis of the differences in the plurality of maximum distance between the first and second color reproducing ranges:

compressing means for compressing said first color space data into said second color reproducing range in a direction toward said predetermined center point by use of the calculated compression ratio calculated by said second calculating means; and further comprising before said dividing means divides the first and second reproducing ranges to sector areas, compression means for preliminary compressing only a luminosity of said first color space data such that the compressed luminosity coincides with a luminosity of the second color space data.

10. A color reproducing apparatus for converting a first color space data having a first color reproduction range into a second color space data having a second color reproduction range, comprising:

dividing means for dividing said first and second color reproducing ranges into a plurality of sector areas, said plurality of sector areas extending radially from a predetermined center point on an achromatic color axis;

first calculating means for calculating for every sector area a plurality of maximum distances between said first and second color reproducing ranges as measured from said predetermined center point:

second calculating means for calculating a compression ratio for compressing said first color space data into said second color space data on the basis of the differences in the plurality of maximum distances between the first and second color reproducing ranges;

compressing means for compressing said first color space data into said second color reproducing range in a direction toward said predetermined center point by use of the calculated compression ratio calculated by said second calculating means;

wherein normalizing means are provided before said dividing means divides said first and second reproducing ranges to sector areas said normalizing means normalizing achromatic color axes of the first and second color space data to a space where a*=b*=0 in an L*a*b* space; and further comprising providing a preliminary compression means before the normalizing means normalizes the achromatic color axes to the a*=b*=0, said preliminary compression means only compressing a luminosity of said first color space data such that the luminosity of first color space data coincides with the luminosity of the second color space data.

11. A color reproducing method for converting a first color space data having a first color reproducing range into a second color space data having a second color reproducing range substantially without losing a balance between luminosity and chroma and substantially without shifting hue, said second color reproducing range being smaller than said first color reproducing range, comprising the steps of:

dividing the first and second color reproducing ranges into a plurality of sector areas by dividing the hue of said first and second color reproducing ranges equally by a first predetermined angle and dividing said first and second color reproducing ranges in the L* and a* plane equally by a second redetermined angle, said plurality of sector areas extending radially from a predetermined center point on an achromatic color axis;

calculating for every sector area a plurality of maximum distances between said first and second color reproducing ranges as measured from said predetermined center point;

another calculating step for calculating an expansion ratio for expanding said second color space data into said first color space data on the basis of differences in the plurality of maximum distances between the first and second color reproducing ranges; and expanding said second color space data into said first color reproducing range in a direction away from said predetermined center point by use of the calculated expansion ratio.

12. A color reproducing apparatus for converting a first color space data having a first color reproduction range into a second color space data having a second color reproduction range substantially without losing a balance between luminosity and chroma and substantially without shifting hue, said second color reproducing range being smaller than said first color reproducing range, comprising:

dividing means for dividing said first and second color reproducing ranges into a plurality of sector area by dividing the hue of said first and second color reproducing ranges equally by a first predetermined angle and dividing said first and second color reproducing ranges in the L* and a* plane equally by a second predetermined angle, said plurality of sector areas extending radially from a predetermined center point on an achromatic color axis;

first calculating means for calculating for every sector area a plurality of maximum distances between said first and second color reproducing ranges as measured from said predetermined center point;

second calculating means for calculating an expansion ratio for expanding said second color space data into said first color space data on the basis of the differences in the plurality of maximum distances between the first and second color reproducing ranges; and expanding means for expanding said second color space data into said first color reproducing range in a direction away from said predetermined center point by use of the calculated expansion ratio calculated by said second calculating means.

* * * * *